(12) United States Patent
Dettinger et al.

(10) Patent No.: US 7,979,424 B2
(45) Date of Patent: *Jul. 12, 2011

(54) DYNAMIC GRAPHICAL DATABASE QUERY INTERFACE

(75) Inventors: Richard Dean Dettinger, Rochester, MN (US); Judy Immaculate Tina Djugash, New Brighton, MN (US); Jeffrey Wayne Tenner, Rochester, MN (US); Hao Thu Tran, Rochester, MN (US)

(73) Assignee: International Business Machines Corporation, Armonk, NY (US)

( * ) Notice: Subject to any disclaimer, the term of this patent is extended or adjusted under 35 U.S.C. 154(b) by 515 days.

This patent is subject to a terminal disclaimer.

(21) Appl. No.: 12/112,332

(22) Filed: Apr. 30, 2008

(65) Prior Publication Data

US 2008/0201313 A1    Aug. 21, 2008

Related U.S. Application Data

(63) Continuation of application No. 11/097,800, filed on Apr. 1, 2005, now Pat. No. 7,490,100.

(51) Int. Cl.
*G06F 17/30* (2006.01)
(52) U.S. Cl. .......... 707/718; 707/766; 707/779
(58) Field of Classification Search .......... 707/713, 707/779, 766, 999.003
See application file for complete search history.

(56) References Cited

U.S. PATENT DOCUMENTS

| | | | |
|---|---|---|---|
| 5,428,776 A * | 6/1995 | Rothfield | 1/1 |
| 5,812,840 A | 9/1998 | Schwartz | |
| 6,460,031 B1 | 10/2002 | Wilson et al. | |
| 6,738,768 B1 * | 5/2004 | Johnson | 1/1 |
| 6,785,668 B1 * | 8/2004 | Polo et al. | 707/771 |
| 7,055,098 B2 | 5/2006 | Hull et al. | |
| 7,356,774 B2 | 4/2008 | Shah et al. | |
| 2003/0065650 A1 | 4/2003 | Annand et al. | |
| 2003/0069882 A1 | 4/2003 | Nieswand et al. | |
| 2003/0212669 A1 | 11/2003 | Dedhia et al. | |
| 2004/0117392 A1 | 6/2004 | Burgmeier | |
| 2004/0186840 A1 | 9/2004 | Dettinger et al. | |
| 2004/0220927 A1 | 11/2004 | Murthy et al. | |
| 2005/0004911 A1 * | 1/2005 | Goldberg et al. | 707/7 |

OTHER PUBLICATIONS

Special Edition Using Microsoft XP, Ed Bott and Woody Leonhard, May 2001, Associate Publisher Gret Wiegand, pp. 277-278.

* cited by examiner

*Primary Examiner* — Don Wong
*Assistant Examiner* — Belinda Xue
(74) *Attorney, Agent, or Firm* — Martin & Associates, LLC; Derek P. Martin

(57) ABSTRACT

A graphical query interface provides visual feedback to a user during the construction of a query. In a first embodiment, the visual feedback helps the user determine the quality of the query as the query is being built. The relationship of columns in the database is graphically displayed to a user. When the user selects a column in the database, a filtered display mechanism displays only those columns or records that satisfy the portion of the query already constructed. In a second embodiment, the visual feedback eliminates some possible selections in the query tree due to previously-made selections that eliminate the eliminated selections as possibilities. In the second embodiment, the visual feedback mechanism may function according to data values in columns, and may also function according to known relationships between columns themselves.

18 Claims, 15 Drawing Sheets

Graphical Query Interface for: GeneDatabase  400

*Click!*
Create a new query
Use this option to create a new query

Work with existing queries
Use this option to create run, copy, edit, or delete your saved queries. In addition, you can run or copy queries saved for public use.

FIG. 4   Prior Art

Graphical Query Interface for: GeneDatabase  500

Conditions
No conditions defined for this query

Modify Query
[ Add Condition ]   [ Set Parameters ]   [ Change Output ]
*Click!*
[ Change Format ]

FIG. 5   Prior Art

Graphical Query Interface for: GeneDatabase  600

Select a Column
[ GeneChip Array ]   [ Experiment ]   [ BioAssay ]
[ Probe Set ID ]   [ Organism ]   [ UniGene ]
*Click!*

FIG. 6   Prior Art

Graphical Query Interface for: GeneDatabase

Select a ProbeSet ID

| 45995_at | 45998_at | 45999_at | 46002_rf |
| 46002_rdz | 46005_bc | 46010_kj | 46345_fw |
| 46458_qa | 46455_tg | 46459_pm | 46488_ng |
| 46502_rt_a | 46593_btv | 46690_cx | 46784_lh |
| 46855_qk | 46872_ub | 46875_fs | 46933_hw |
| 46991_cy | 47038_ph | 47125_xfd | 47286_ur |
| 47301_hs | 47456_ij | 47513_mx | 47788_pl |
| 47826_jw | 47943_op | 48034_wa | 48191_nv |
| 48330_wm | 48415_kz | 48529_ud | 48600_qy |
| 48720_jx | 48947_lw | 49022_dc | 49111_her |
| 49233_ps | 49312_kk | 49441_hy | 49522_fc |
| 49710_sx | 49889_lj | 49954_hy | 50031_ws |
| 50157_lk | 50246_aq | 50399_dc | 50408_ss |
| 50526_luw | 50643_qp | 50810_xm | 50927_tt |
| 51015_hg | 51112_md | 51234_ed | 51366_ut |
| 51560_yi | 51691_jd | 51743_pa | 51847_by |
| 51929_so | 52028_nc | 52169_mo | 52202_ls |
| 52444_ur | 52522_rv | 52680_lm | 52771_pm |
| 52805_oc | 53071_wh | 53112_tg | 53229_vv |
| 53377_at | 53384_qat | 53497_oo | 53565_zr |
| 53720_poj | 53879_wl | 53980_mo | 54120_rk |

FIG. 10     Prior Art

DYNAMIC GRAPHICAL DATABASE QUERY INTERFACE

CROSS-REFERENCE TO PARENT APPLICATIONS

This patent application is a continuation of a patent application of the same title, U.S. Ser. No. 11/097,800 filed on Apr. 1, 2005, which is a continuation-in-part (CIP) of the earlier patent application entitled "Dynamic Graphical Database Query and Data Mining Interface", Ser. No. 10/865,261 filed on Jun. 10, 2004. Both of these parent patent applications are incorporated herein by reference.

BACKGROUND OF THE INVENTION

1. Technical Field

This invention generally relates to computer systems, and more specifically relates to apparatus and methods for querying a database.

2. Background Art

Since the dawn of the computer age, computers have evolved and become more and more powerful. In our present day, computers have become indispensable in many fields of human endeavor including engineering design, machine and process control, information storage and retrieval, and office computing. One of the primary uses of computers is for information storage and retrieval.

Database systems have been developed that allow a computer to store a large amount of information in a way that allows a user to search for and retrieve specific information in the database. For example, an insurance company may have a database that includes all of its policy holders and their current account information, including payment history, premium amount, policy number, policy type, exclusions to coverage, etc. A database system allows the insurance company to retrieve the account information for a single policy holder among the thousands and perhaps millions of policy holders in its database.

Retrieval of information from a database is typically done using queries. A query usually specifies conditions that apply to one or more columns of the database, and may specify relatively complex logical operations on multiple columns. The database is searched for records that satisfy the query, and those records are returned as the query result.

One problem with using queries to retrieve information from a database is that using queries typically requires specialized knowledge of a query language, such as Structured Query Language (SQL), as well as detailed knowledge of the database and its relationships. There are many applications where a person needs to query a database, but does not have the detailed knowledge of a query language or the details of the database. Some efforts have been made to provide a graphical query interface that allows a person that does not know SQL to query a database. The main focus of these known graphical query interfaces is abstracting the database and providing an easy-to-use interface for building queries. One problem with these known graphical query interfaces is a user can construct queries that are not very meaningful because they return no data, or because they return thousands or millions of records. Because the graphical query interface abstracts the details of the database to the user, the user has no idea whether two tables might represent disjoint sets of data. As a result, the user receives no feedback from known graphical query interfaces regarding the quality of the query until the query is completely built and then executed. If the size of the dataset is too large or too small, the user has no information regarding relationships in the database that allow the user to modify the query to return an acceptable dataset. The result in the prior art is the generation of queries that are not terribly useful because they return a dataset that is too large or too small to be useful.

Another problem with queries is that a user that builds a query may not know relationships between columns in the database, which could result in building a query that includes conflicting columns. For example, in a medical database, one could build a query to return all male patients that had a positive pregnancy test. Of course, such a query is nonsense and will return no records. While this example query would probably never be run, because a user can easily visually determine that a male person could not be pregnant, there are many other relationships between columns in a database that are much more subtle, and may even be unknown to the user. For example, in a medical database, there may be specimen data that should only be accessed if the data is anonymous. However, one could easily build a query using known tools that include patient information and specimen data, thereby violating the anonymity rule. Without a way to generate queries in a way that provides an indication of the quality of the query before the query is executed, and to build a query using a tool that shows restrictions between columns in a graphical representation of the query, the computer industry will continue to suffer from the generation and execution of queries that do not return a useful dataset, or that violate predefined rules.

DISCLOSURE OF INVENTION

A graphical query interface provides visual feedback to a user during the construction of a query. In a first embodiment, the visual feedback helps the user determine the quality of the query as the query is being built. The graphical query interface determines relationships in the database from a database relationship document, such as an XML document. These relationships may be between columns, including columns in different tables. The relationship of columns in the database is then graphically displayed to a user. When the user selects a column in the database, a filtered display mechanism displays only those columns or records that satisfy the portion of the query already constructed. In this manner dynamic information is provided to the user as the user builds the query that indicates to the user the quality of the query.

In a second embodiment, the visual feedback restricts the ability of the user to select some columns in the query tree due to previously-made selections that limit the selections by the user according to predefined rules. The predefined rules may specify relationships between columns, and may specify relationships between columns based on a data value in one or more of the columns. Thus, if Gender=Male is selected as a restriction in a query, a Pregnancy Test can be eliminated as one of the possible choices. Furthermore, if data in a Specimen column can only be used if the gender is unknown, selecting the gender as a restriction causes the Specimen column to be eliminated from consideration in building the query. Making a column unavailable for selection by the user may be performed by eliminating the column from the graphical representation, by hiding the column in the graphical representation from view of the user, and by greying out the column in the graphical representation.

The foregoing and other features and advantages of the invention will be apparent from the following more particular description of preferred embodiments of the invention, as illustrated in the accompanying drawings.

BRIEF DESCRIPTION OF DRAWINGS

The preferred embodiments of the present invention will hereinafter be described in conjunction with the appended drawings, where like designations denote like elements, and:

FIG. 4 is a display of one sample screen in a known graphical query interface;

FIG. 5 is a display of a sample screen in a known graphical query interface that is displayed in response to the user selecting the "Create a new query" link on the display in FIG. 4;

FIG. 6 is a display of a sample screen in a known graphical query interface that is displayed in response to the user selecting the Add Condition button in the display of FIG. 5;

FIG. 10 is a display of a sample screen in a known graphical query interface that is displayed in response to the user selecting the Probe Set ID button in the display of FIG. 9;

Figure 1:
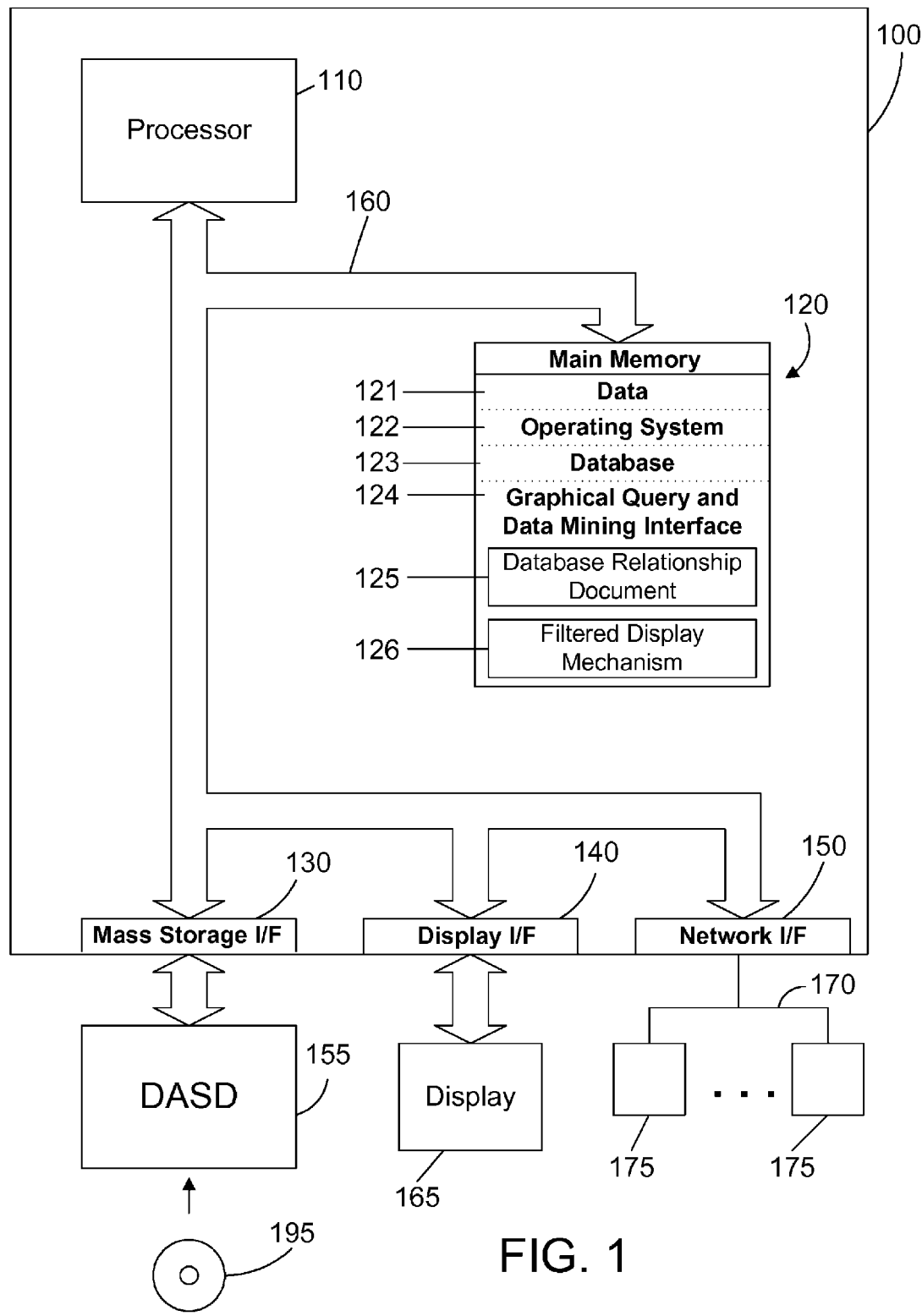
FIG. 1 is a block diagram of an apparatus in accordance with the preferred embodiments.

BEST MODE FOR CARRYING OUT THE INVENTION 1.0 Overview

The present invention relates to database queries. For those not familiar with databases or queries, this Overview section will provide background information that will help to understand the present invention.

Known Databases and Database Queries

There are many different types of databases known in the art. The most common is known as a relational database (RDB), which organizes data in tables that have rows that represent individual entries or records in the database, and columns that define what is stored in each entry or record.

To be useful, the data stored in databases must be able to be efficiently retrieved. The most common way to retrieve data from a database is to generate a database query. A database query is an expression that is evaluated by a database manager. The expression may contain one or more predicate expressions that are used to retrieve data from a database. For example, let's assume there is a database for a company that includes a table of employees, with columns in the table that represent the employee's name, address, phone number, gender, and salary. With data stored in this format, a query could be formulated that would retrieve the records for all female employees that have a salary greater than $40,000. Similarly, a query could be formulated that would retrieve the records for all employees that have a particular area code or telephone prefix.

One popular way to define a query uses Structured Query Language (SQL). SQL defines a syntax for generating and processing queries that is independent of the actual structure and format of the database. SQL is very powerful for those who have detailed knowledge of SQL and who have detailed knowledge of the database being queried. However, there are a growing number of circumstances where people who do not have a detailed knowledge of SQL or the database need to be able to query the database. As a result, graphical query interfaces have been developed that help a user to query a database even if the user does not know SQL and does not know the detailed relationships in the database. For example, IBM Corporation has developed an object oriented framework known as a Data Discovery and Query Builder. This framework abstracts out the query layer from the user and lets the user build queries using a graphical interface. For example, medical researchers that perform DNA mapping may need to access data in a very large database. A graphical query interface could be defined that uses the Data Discover and Query Builder framework that allows the researcher to access information in the database without writing SQL queries and without understanding many of the relationships in the database.

The emphasis with the Data Discovery and Query Builder framework and with other known graphical query interfaces is to provide data abstraction and analysis plugins. Known graphical query interfaces do not allow a user to view database relationships, and do not filter displayed selections based on the portion of the query that has already been defined. As a result, the user, who does not have detailed knowledge of the database relationships, may define a query that could return millions of records, or could define a query that returns no records. Known graphical query interfaces provide no feedback to the user regarding the quality of the query they are building. As a result, the user may spend time building a query only to find out after executing the query that the query did not return the desired data. The user must then guess at what changes to make to the query so that it returns the desired data.

Figure 3:
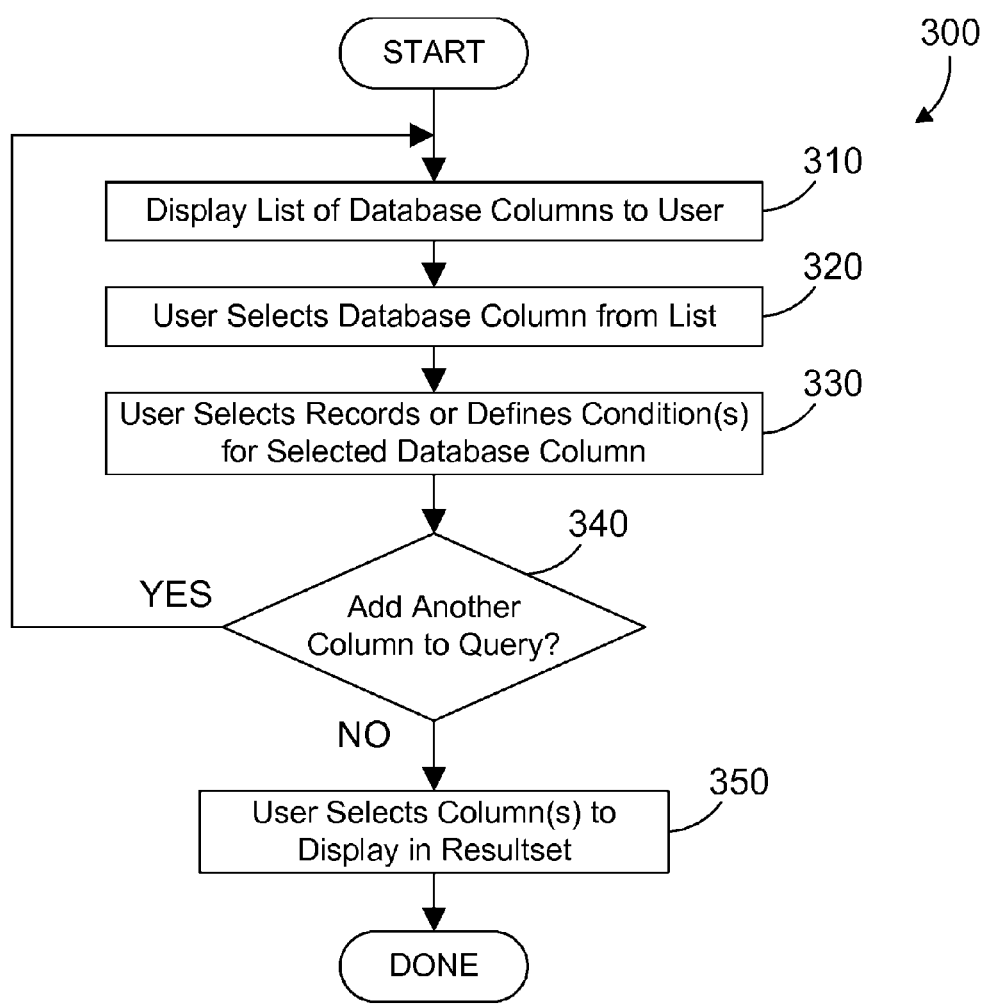
FIG. 3 is a flow diagram of a prior art method executed by a known graphical query interface.
Figure 7:
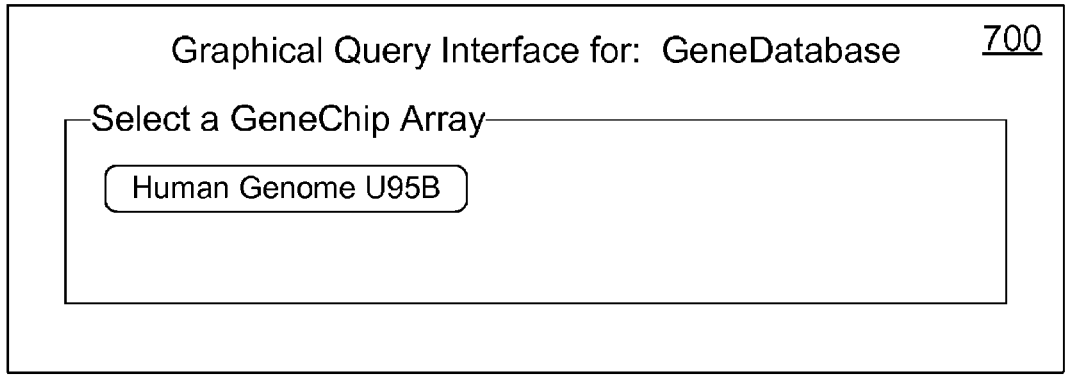
FIG. 7 is a display of a sample screen in a known graphical query interface that is displayed in response to the user selecting the GeneChip Array button in the display of FIG. 6.

An example will illustrate the deficiencies in prior art graphical query interfaces. Referring to FIG. 3, a prior art method 300 for graphically building a query begins by displaying a list of database columns to the user (step 310). The user selects a database column from the list (step 320). The user may then select individual records, or may define one or more conditions for the selected database column (step 330). If no other columns need to be added to the query (step 340=NO), the user then selects the column or columns to display in the resultset (step 350). If another column needs to be added to the query (step 340=YES), method 300 loops back to step 310 and continues.

One of the problems in method 300 is that all the available columns in the database are displayed to the user in step 310. This is true even when a query has been partially built that would eliminate a vast majority of the columns from consideration. A simple example will help to illustrate, as shown graphically in FIGS. 4-11.

Figure 8:
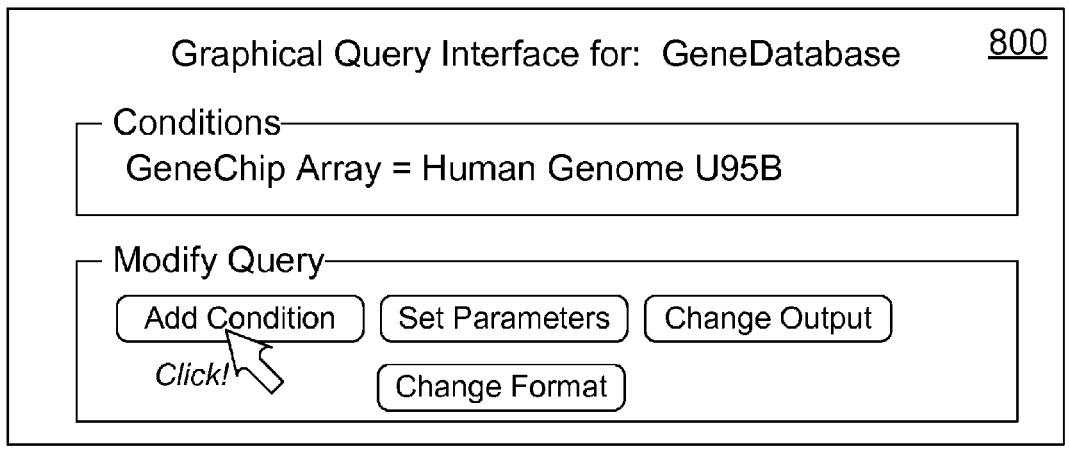
FIG. 8 is a display of a sample screen in a known graphical query interface that is displayed once the user has selected Human Genome U95B in the display of FIG. 7.
Figure 9:
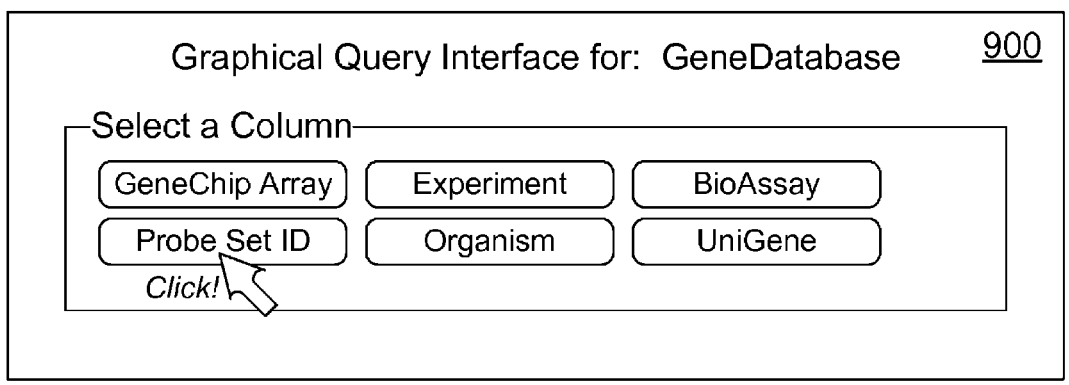
FIG. 9 is a display of a sample screen in a known graphical query interface that is displayed in response to the user selecting the Add Condition button in the display of FIG. 8.
Figure 11:
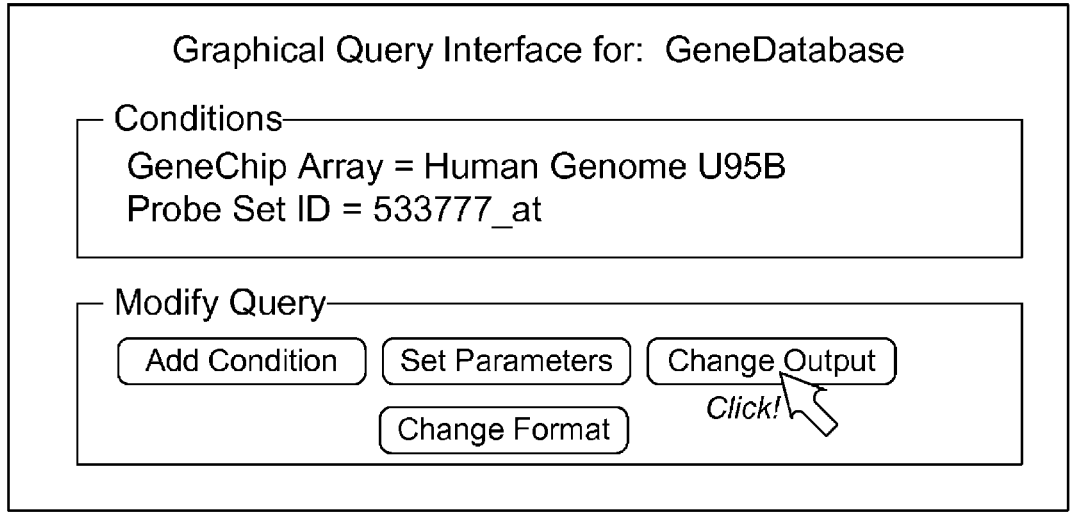
FIG. 11 is a display of a sample screen in a known graphical query interface that is displayed once the user has selected the 533777_at Probe Set ID in the display of FIG. 10.
Figure 12:
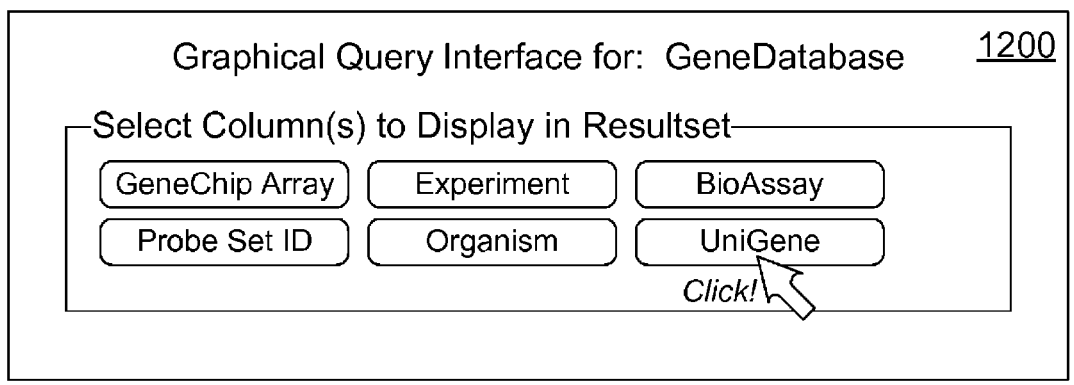
FIG. 12 is a display of a sample screen in a known graphical query interface that is displayed to allow the user to select one or more columns to display in the query resultset.

Referring to FIG. 4, a display window 400 shows a graphical query interface for a gene database. We assume for this example that the user clicks on the "Create a new query" link. In response, the display window 500 of FIG. 5 is displayed to the user. Note that no conditions have been defined for the new query, so the user clicks on the "Add Condition" button. In response, the display window 600 of FIG. 6 is displayed to the user. We assume for this example that the user selects the GeneChip Array by clicking on the corresponding button, as shown in FIG. 6. In response, the display window 700 is displayed to the user, showing all of the GeneChip Array entries in the database. For this example, we assume a single GeneChip Array named Human Genome U95B is the sole GeneChip Array in the database, so this is the sole button displayed to the user in FIG. 7. Once the user clicks on the Human Genome U95B button in the display window 700 of FIG. 7, the display window 800 of FIG. 8 is displayed to the user. Note that the Conditions portion of the display window 800 now shows that the user has selected the Human Genome U95B GeneChip Array. We assume the user now clicks on the Add Condition button, as shown in FIG. 8. In response, the display window 900 of FIG. 9 is displayed to the user. Note this display window presents the same selections as the display window 600 in FIG. 6. We assume the user now clicks on the Probe Set ID button, as shown in FIG. 9. In response, the list of Probe Set IDs are displayed to a user, as shown in FIG. 10. We assume for this example that there are thousands of Probe Set IDs in the database. The display window 1000 in FIG. 10 only shows a relatively small number, as indicated by the size of the scroll bar button to the right of the display window 1000. At this point, the user has no idea which Probe Set ID or IDs relate to the Human Genome U95B GeneChip Array that has already been selected, because the prior art graphical query interface displays all of the Probe Set IDs that exist in the database. As a result, the user may have to manually hunt through a paper trail to find which Probe Set IDs correspond to the Human Genome U95B GeneChip Array. We assume for this simple example that the selections 1010, 1020 and 1030 in FIG. 10 correlate to valid Probe Set IDs for the Human Genome U95B GeneChip Array. Yet the user is not provided with any of this information by the graphical query interface. Herein lies the primary deficiency in known graphical query interfaces. The user could easily select any of the Probe Set IDs shown in FIG. 10. Selecting any of the Probe Set IDs other than those corresponding to 1010, 1020 and 1030 results in selecting disjoint data, which results in the query returning no rows. Assuming the user somehow successfully identifies that Probe Set ID 5337_at is the desired Probe Set ID (from paper records or from some source of information external to the graphical query interface), the user clicks on button 1020. As a result, the display window 1100 of FIG. 11 is then displayed to the user. Note that the Conditions box now includes both the selections the user has already made. We assume the user clicks on the Change Output button, as shown in FIG. 11. As a result, the screen 1200 shown in FIG. 12 is displayed to the user, allowing the user to select one or more columns for display in the resultset. Once the query conditions are defined and the columns to display have been specified, the user could execute the query. However, because the graphical query interface illustrated in FIGS. 3-12 does not provide any visual feedback to the user regarding the quality of the query as it is being built, the user will have to wait until the query is actually executed before knowing whether or not the query will return the desired data.

2.0 Description of the Preferred Embodiments

The dynamic graphical query interface in accordance with the first embodiment of the present invention provides graphical feedback to the user regarding the quality of the query while the query is being built. Database relationships are displayed to the user. When the user selects something in the database, the display of available selections is filtered according to the portion of the query that has already been constructed. In this manner the user is provided dynamic visual feedback regarding the quality of the query as the query is being built. Using this interface, a user may also mine data from the database because the relationships between database columns are shown, and because the displayed results are filtered according to the user's selections.

The dynamic graphical query interface in accordance with the second embodiment aids in query construction by dynamically modifying a graphical representation of the query according to a set of predefined rules and according to the user's selections. For example, if a user selects a Gender column, and specifies a value of Gender=male, the dynamic graphical query and data mining interface automatically removes the column Pregnancy from the graphical representation, assuming a rule is defined that specifies that Gender=male removes the Pregnancy column. Of course, many different types of rules may be defined that govern the removal of items in a graphical representation of a database according to selections made by the user in building a query.

Referring to FIG. 1, a computer system 100 is one suitable implementation of an apparatus in accordance with the preferred embodiments of the invention. Computer system 100 is an IBM eServer iSeries computer system. However, those skilled in the art will appreciate that the mechanisms and apparatus of the present invention apply equally to any computer system, regardless of whether the computer system is a complicated multi-user computing apparatus, a single user workstation, or an embedded control system. As shown in FIG. 1, computer system 100 comprises a processor 110, a main memory 120, a mass storage interface 130, a display interface 140, and a network interface 150. These system components are interconnected through the use of a system bus 160. Mass storage interface 130 is used to connect mass storage devices, such as a direct access storage device 155, to computer system 100. One specific type of direct access storage device 155 is a readable and writable CD RW drive, which may store data to and read data from a CD RW 195.

Main memory 120 in accordance with the preferred embodiments contains data 121, an operating system 122, a database 123, and a graphical query and data mining interface 124. Data 121 represents any data that serves as input to or output from any program in computer system 100. Operating system 122 is a multitasking operating system known in the industry as OS/400; however, those skilled in the art will appreciate that the spirit and scope of the present invention is not limited to any one operating system. Database 123 is any suitable database, whether currently known or developed in the future. Database 123 preferably includes one or more tables. Graphical query and data mining interface 124 provides a graphical query interface that provides dynamic feedback to the user that helps the user understand relationships in the database without destroying the abstractions provided by the interface, and in a way that helps the user build a useful query. The graphical query and data mining interface 124 includes a database relationship document 125 that specifies relationships in the database 123. A significant advantage of the preferred embodiments is the ability to specify relationships in the database relationship document 125 that span across different tables. The database relationship document 125 is preferably an extensible Markup Language (XML) document. By reading the database relationship document 125, the graphical query and data mining interface 124 may determine one or more relationships in the database 123, including relationships across multiple tables, which may then be displayed to a user.

The graphical query and data mining interface 124 also includes a filtered display mechanism 126. This mechanism helps the user to know the quality of the query as the query is being constructed. When a user makes a selection in the database, the information displayed to the user is then filtered by the filtered display mechanism 126 to only display information that satisfies all of the previous user selections. In this manner the amount of information presented to the user is reduced so the user can make more intelligent decisions regarding how to build a query that will return a desired number of rows. In addition, the user will know if the query being built will return no records during the construction of the query, thereby allowing the user to back up and specify one or more different selections that will return desired data.

This is a huge improvement over the prior art, which allows the user to graphically build a query, but provides no indication of the quality of the query until the query is executed. At the point of executing the query, if the query returns no rows, or thousands of rows, the query is probably not terribly useful to the user. The filtered display mechanism 126 presents only information that meets the criteria of information that the user has previously selected. In this manner the user receives a visual indication of the quality of the query as the query is being built.

Due to the dynamic visual feedback provided by the user, the graphical query and data mining interface 124 may be easily used to mine data from a database. As the user adds selections to the query, the results are repeatedly narrowed and filtered to display only those selections that meet all of the previously-selected criteria. As a result, the interface 124 is a very effective tool for a user to mine data from the database 123.

Computer system 100 utilizes well known virtual addressing mechanisms that allow the programs of computer system 100 to behave as if they only have access to a large, single storage entity instead of access to multiple, smaller storage entities such as main memory 120 and DASD device 155. Therefore, while data 121, operating system 122, database 123, and graphical query and data mining interface 124 are shown to reside in main memory 120, those skilled in the art will recognize that these items are not necessarily all completely contained in main memory 120 at the same time. It should also be noted that the term "memory" is used herein to generically refer to the entire virtual memory of computer system 100, and may include the virtual memory of other computer systems coupled to computer system 100.

Processor 110 may be constructed from one or more microprocessors and/or integrated circuits. Processor 110 executes program instructions stored in main memory 120. Main memory 120 stores programs and data that processor 110 may access. When computer system 100 starts up, processor 110 initially executes the program instructions that make up operating system 122. Operating system 122 is a sophisticated program that manages the resources of computer system 100. Some of these resources are processor 110, main memory 120, mass storage interface 130, display interface 140, network interface 150, and system bus 160.

Although computer system 100 is shown to contain only a single processor and a single system bus, those skilled in the art will appreciate that the present invention may be practiced using a computer system that has multiple processors and/or multiple buses. In addition, the interfaces that are used in the preferred embodiment each include separate, fully programmed microprocessors that are used to off-load compute-intensive processing from processor 110. However, those skilled in the art will appreciate that the present invention applies equally to computer systems that simply use I/O adapters to perform similar functions.

Display interface 140 is used to directly connect one or more displays 165 to computer system 100. These displays 165, which may be non-intelligent (i.e., dumb) terminals or fully programmable workstations, are used to allow system administrators and users to communicate with computer system 100. Note, however, that while display interface 140 is provided to support communication with one or more displays 165, computer system 100 does not necessarily require a display 165, because all needed interaction with users and other processes may occur via network interface 150. Network interface 150 is used to connect other computer systems and/or workstations (e.g., 175 in FIG. 1) to computer system 100 across a network 170. The present invention applies equally no matter how computer system 100 may be connected to other computer systems and/or workstations, regardless of whether the network connection 170 is made using present-day analog and/or digital techniques or via some networking mechanism of the future. In addition, many different network protocols can be used to implement a network. These protocols are specialized computer programs that allow computers to communicate across network 170. TCP/IP (Transmission Control Protocol/Internet Protocol) is an example of a suitable network protocol.

At this point, it is important to note that while the present invention has been and will continue to be described in the context of a fully functional computer system, those skilled in the art will appreciate that the present invention is capable of being distributed as a program product in a variety of forms, and that the present invention applies equally regardless of the particular type of computer-readable signal bearing media used to actually carry out the distribution. Examples of suitable computer-readable signal bearing media include: recordable type media such as floppy disks and CD RW (e.g., 195 of FIG. 1), and transmission type media such as digital and analog communications links.

Figure 2:
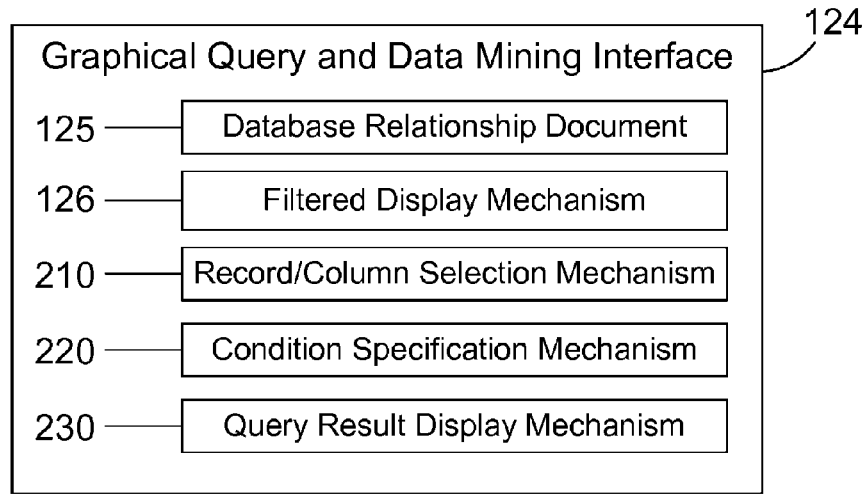
FIG. 2 is a block diagram of the graphical query and data mining interface shown in FIG. 1.

Referring now to FIG. 2, additional details of the graphical query and data mining interface 124 shown in FIG. 1 include a record/column selection mechanism 210, a condition specification mechanism 220, and a query result display mechanism 230. The record/column selection mechanism 210 allows a user to select appropriate columns or rows in the database for inclusion in the query being built. The condition specification mechanism 220 allows specifying conditions for the query, such as ranges, arithmetic operators, logical operators, etc. The query result display mechanism 230 displays to the user the results of executing the query.

Figure 13:
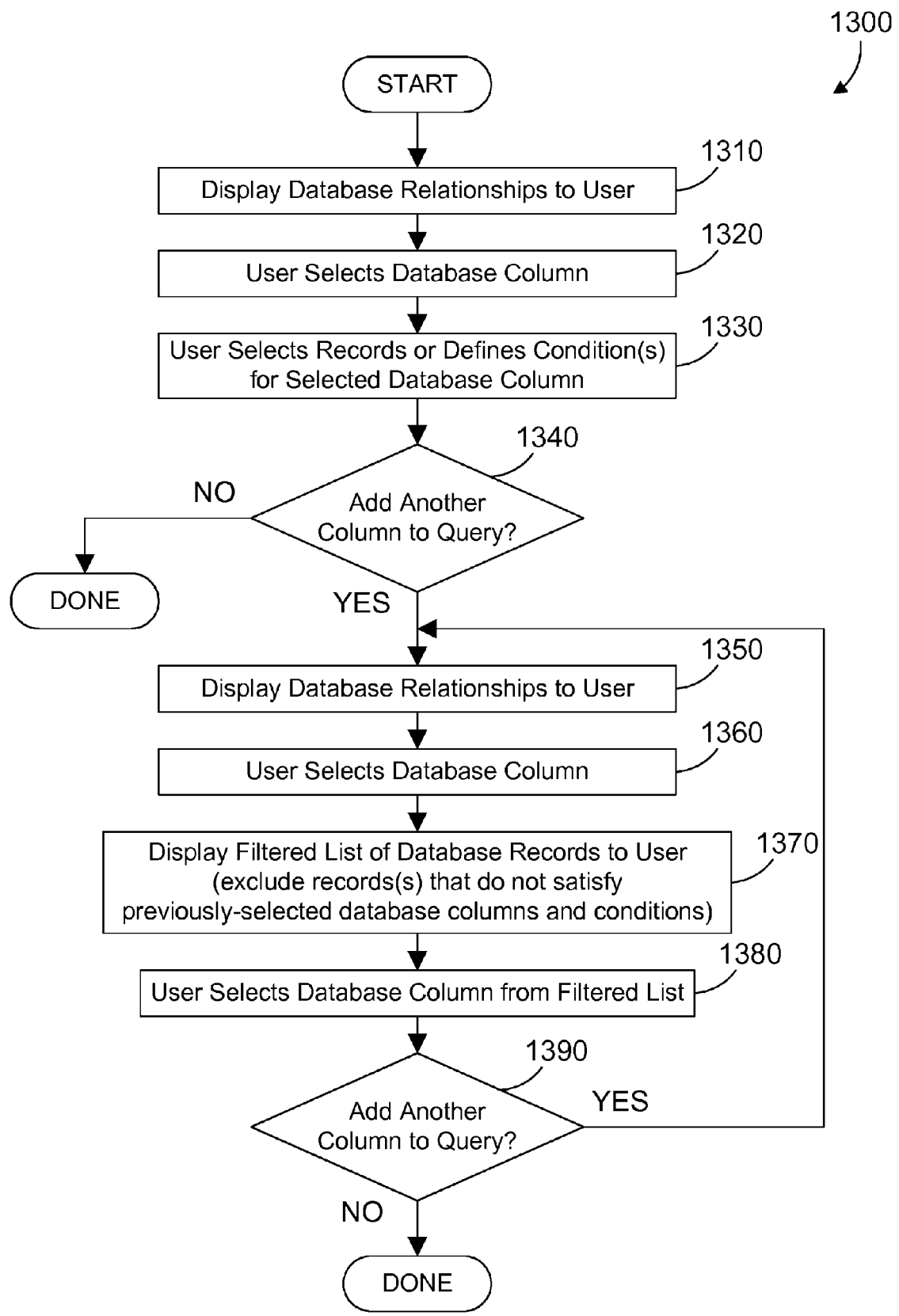
FIG. 13 is a flow diagram of a method executed by the graphical query and data mining interface in accordance with the first embodiment.

Referring to FIG. 13, a method 1300 in accordance with the preferred embodiments begins by displaying database relationships to the user (step 1310). The database relationships are preferably determined by the graphical query and data mining interface reading the corresponding database relationship document 125 (such as an XML document) that defines the relationships between data in the database. For example, in the field of Microarray research, a standard known as MicroArray Gene Expression (MAGE) is evolving. A standard for MAGE is maintained using the XML format called MAGE-ML. MAGE consists of various different packages, and each package has various data elements associated with it. These relationships could be represented in a tree structure. The MAGE-ML XML file is one specific example of a suitable database relationship document 125 in accordance with the preferred embodiments. Any type of document that provides any information regarding one or more relationships in the database is within the scope of the database relationship document 125.

The user selects a database column from the displayed relationships (step 1320). The user then selects records or defines one or more conditions for the selected database column (step 1330). If no more columns need to be added to the query (step 1340=NO), method 1300 is done. If more columns need to be added to the query (step 1340=YES), the database relationships are again displayed to the user (step 1350). The user then selects a database column from the list (step 1360). The list of possible values is then filtered according to the user's previous selections and displayed to the user (step 1370). The user then selects a database column from the filtered list (step 1380). If another column needs to be added to the query (step 1390=YES), method 1300 loops back to step 1350 and continues. If no other columns need to be added to the query (step 1390=NO), method 1300 is done.

Figure 14:
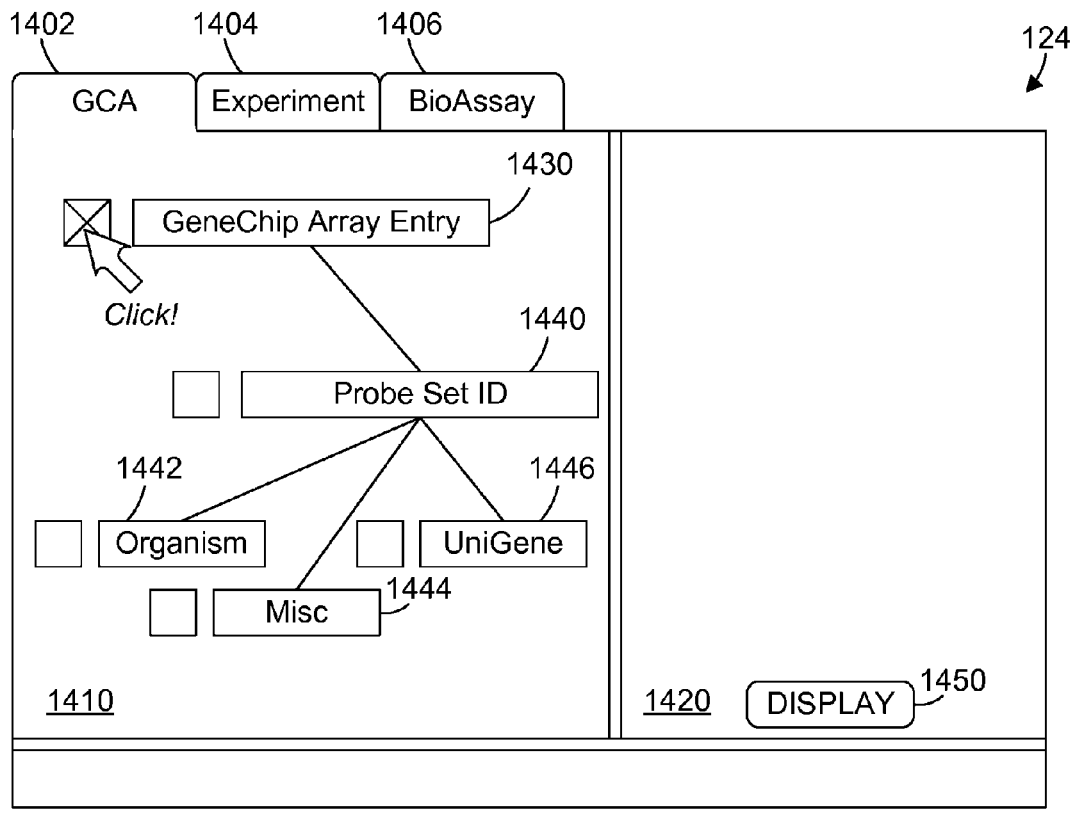
FIG. 14 is a display of the graphical query and data mining interface in FIGS. 1 and 2 that displays database relationships in accordance with the preferred embodiments.
Figure 15:
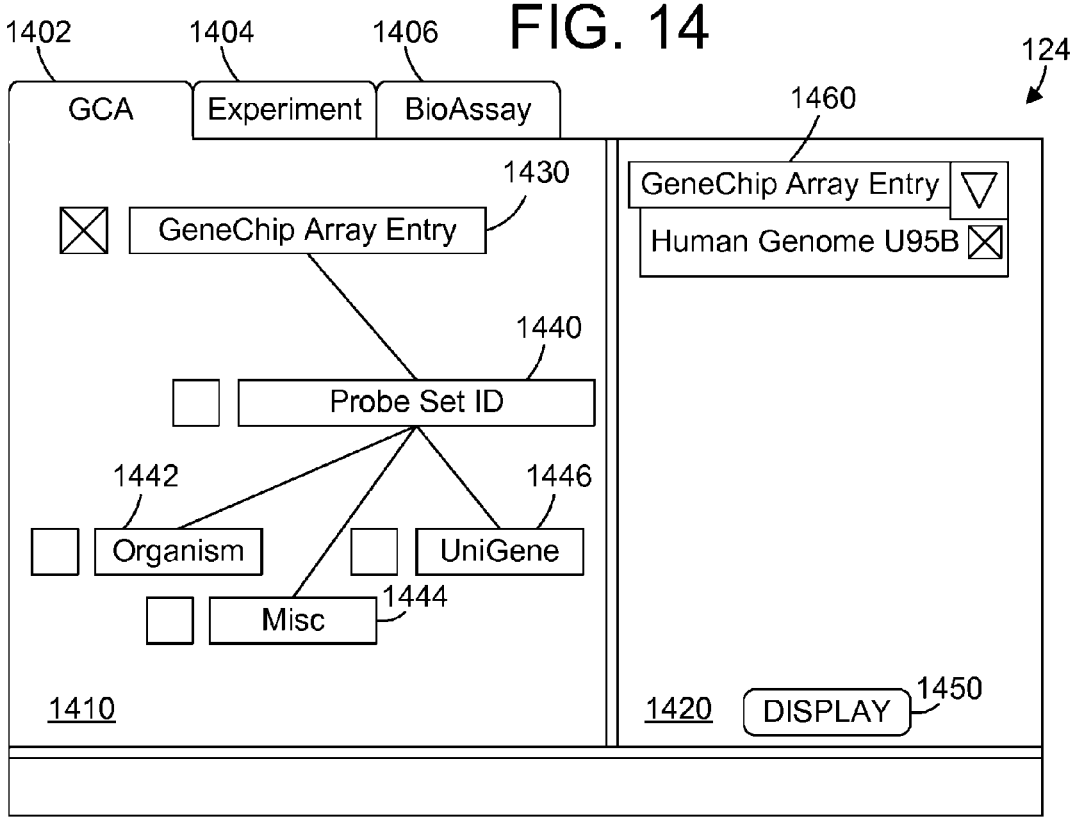
FIG. 15 is a display of the graphical query and data mining interface in FIGS. 1 and 2 that shows the filtered display of information that results from the user selecting the GeneChip Array Entry in FIG. 14, and that allows the user to select from the display selections for GeneChip Array Entries.

A simple example is shown in FIGS. 14-21 that illustrates the advantages of the graphical query and data mining interface 124 of the preferred embodiments. We assume the interface 124 includes multiple tabs 1402, 1404 and 1406. The 1402 tab is selected in all of FIGS. 14-21 for the purpose of illustration, resulting in the display of a corresponding window 1410 that displays database relationship information for GeneChip Arrays (GCA) to the user. We assume that the database relationship information stored in the database relationship document 125 in FIG. 1 includes the relationships displayed graphically in window 1410, namely: a GeneChip Array Entry 1430 includes one or more Probe Set IDs 1440, which includes one or more Organism 1442, Misc 1444, and UniGene 1446. Note that Misc 1444 is representative of any suitable number of additional selections below the Probe Set ID 1440. With this database relationship tree displayed in window 1410, a user may now select the GeneChip Array Entry 1430 by clicking on the box next to it, as shown in FIG. 14. In response, the display window 1420 to the right displays the user's selection, as shown as 1460 in FIG. 15. Note that the GeneChip Array Entry 1460 includes a drop-down list that displays all of the GeneChip Array Entries in the database. For this example, we assume that there is a single GeneChip Array Entry named Human Genome U95B that appears in the drop-down list, so we assume the user selects the Human Genome U95B, as shown by the X in the box to the right of the selection in the drop-down list in FIG. 15.

Figure 16:
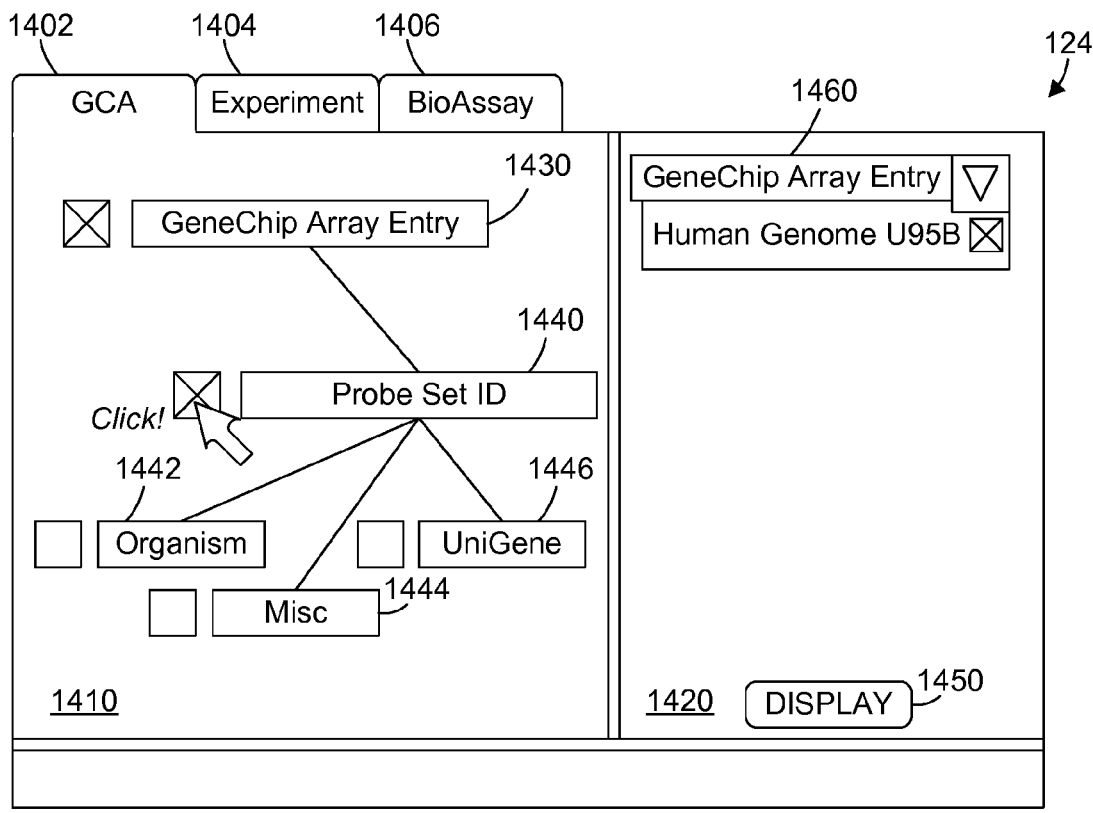
FIG. 16 is a display of the graphical query and data mining interface in FIGS. 1 and 2 when the user selects the Probe Set ID.

Now that the user has selected the desired GeneChip Array Entry in the database, the user may now go back to the relationship diagram in window 1410 and click on the Probe Set ID box, as shown in FIG. 16. In response to the user selecting the Probe Set ID box, the Probe Set ID 1470 is displayed in the window 1420 to the right in FIG. 17. This Probe Set ID 1470 includes a drop-down list. Note, however, that the drop-down list does not include thousands of Probe Set IDs, as depicted in the prior art in FIG. 10. Instead, the list of Probe Set IDs is filtered to display only those Probe Set IDs that correspond to the Human Genome U95B that the user previously selected. This is one of the extremely powerful aspects of the graphical query and data mining interface 124 of the preferred embodiments. With each selection the user makes in window 1420, the future possibilities are filtered according to those selections already made. As a result, the user gets a visual indication of the quality of the query before the query is executed. This also allows for data mining since the graphical indication helps direct the user to certain data.

Figure 17:
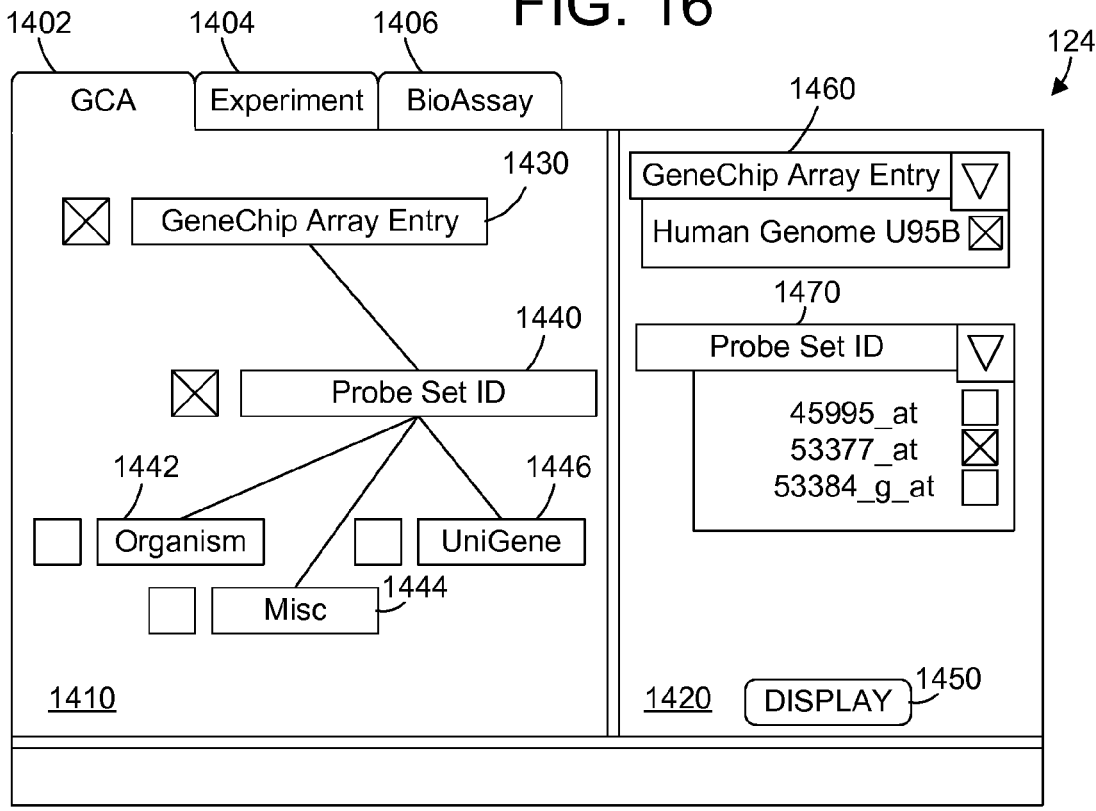
FIG. 17 is a display of the graphical query and data mining interface in FIGS. 1 and 2 that shows the filtered display of information that results from the user selecting the Probe Set ID in FIG. 16, and that allows the user to select from the filtered display selections for Probe Set ID.
Figure 18:
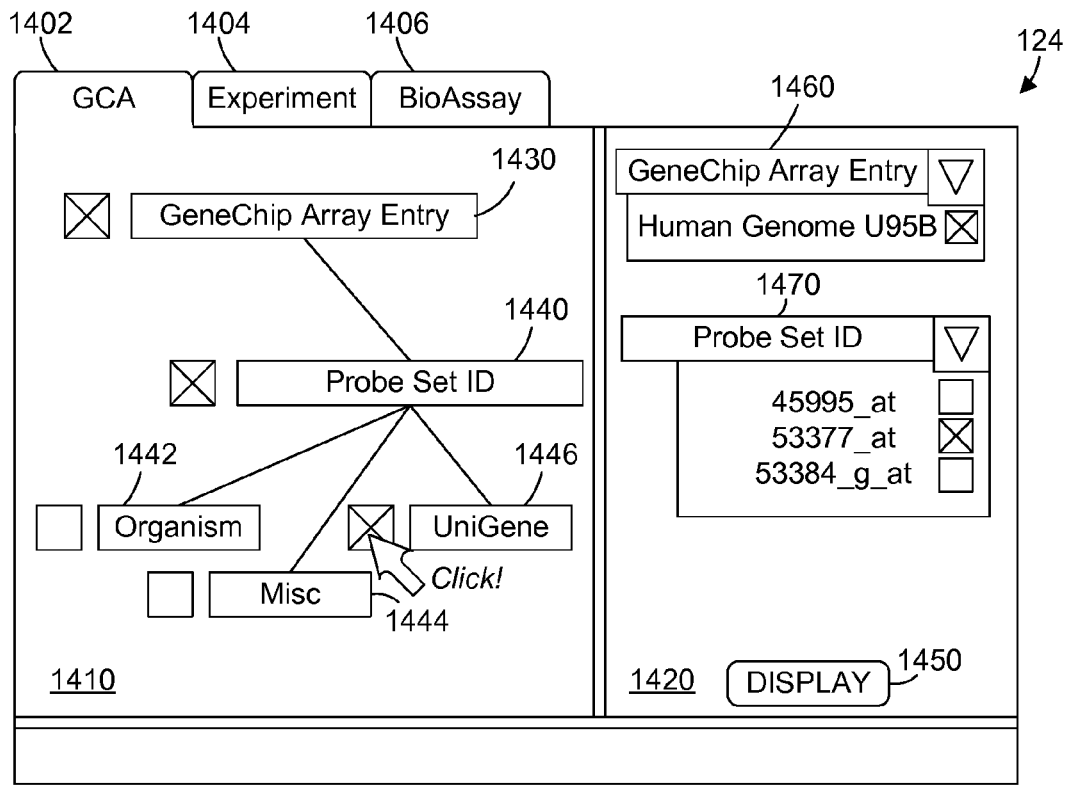
FIG. 18 is a display of the graphical query and data mining interface in FIGS. 1 and 2 when the user selects UniGene.
Figure 19:
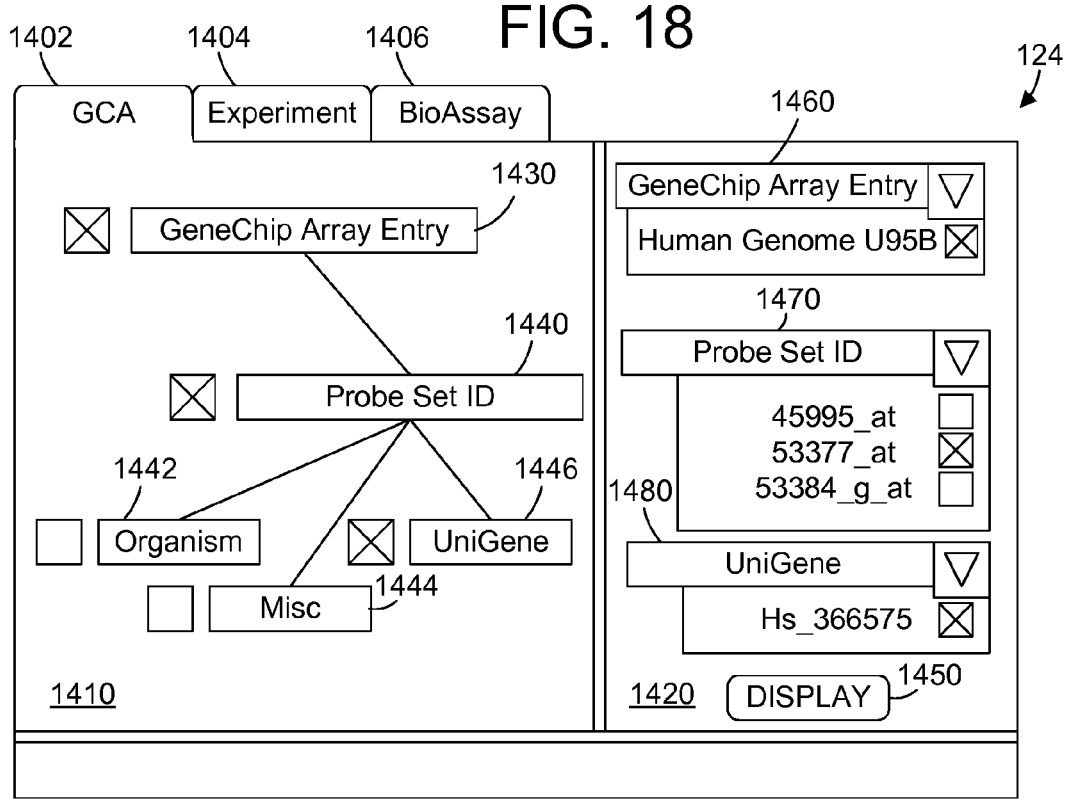
FIG. 19 is a display of the graphical query and data mining interface in FIGS. 1 and 2 that shows the filtered display of information that results from the user selecting UniGene in FIG. 18, and that allows the user to select from the filtered display selections for UniGene.
Figure 20:
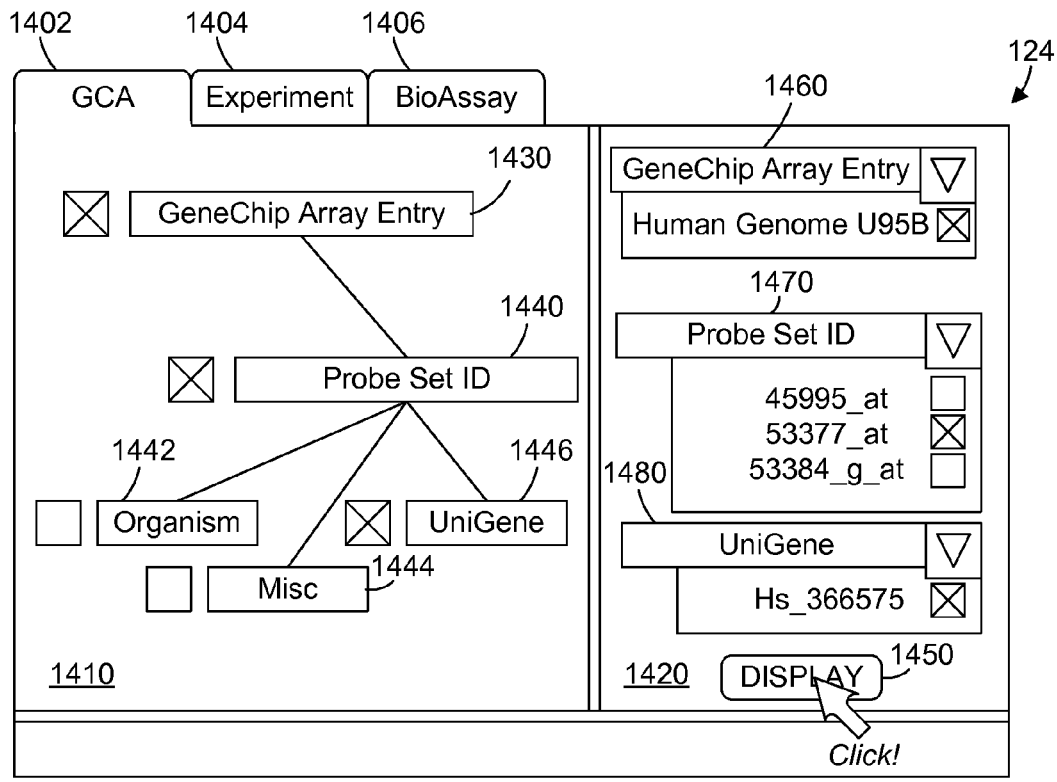
FIG. 20 is a display of the graphical query and data mining interface in FIGS. 1 and 2 when the user selects the Display button.
Figure 21:
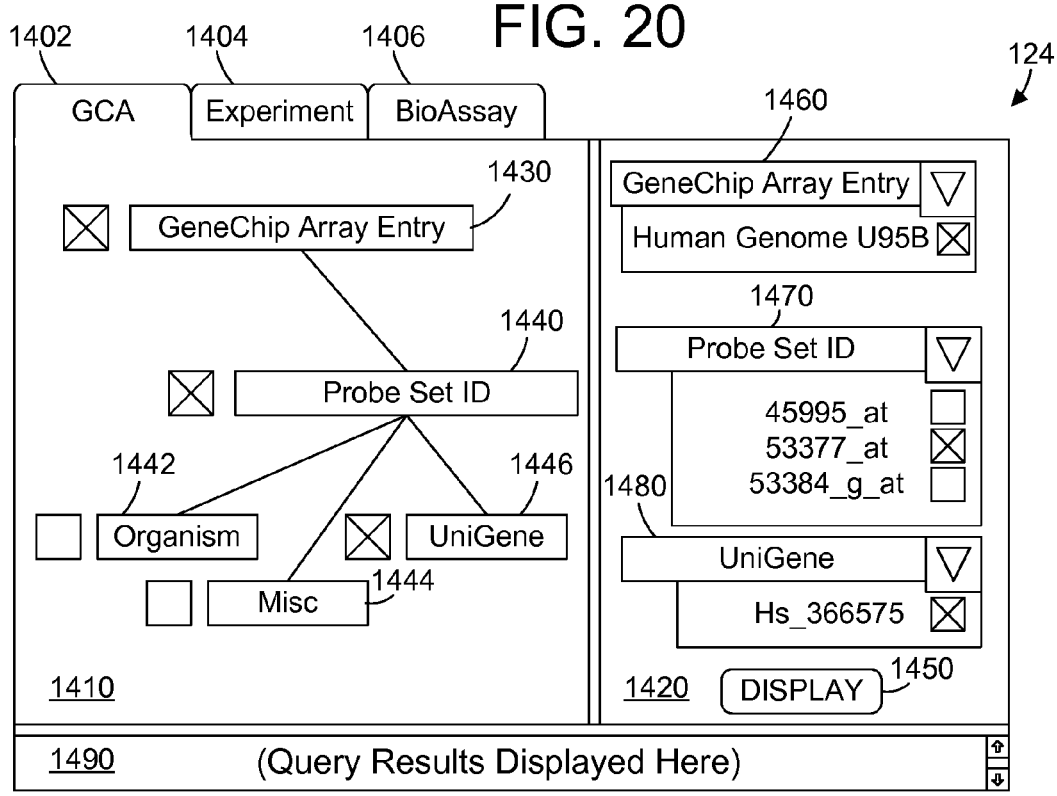
FIG. 21 is a display of the graphical query and data mining interface in FIGS. 1 and 2 that shows the results of executing the query.

We assume the user selects the Probe Set ID 53377_at from the drop-down list, as shown in FIG. 17. Now the user may go back to the relationship diagram in window 1410 and click on the UniGene item 1446, as shown in FIG. 18. When the UniGene item is clicked in FIG. 18, a UniGene 1480 is displayed in the window 1420 of FIG. 19. Note that the UniGene 1480 includes a drop-down list that is filtered to show only the UniGenes that satisfy the two earlier user selections above (namely, GeneChip Array Entry=Human Genome U95B, and Probe Set ID=53377_at). There may be thousands or millions of UniGenes, but filtering the list according to the previous selections narrows the list to a single UniGene, namely Hs_366575, as shown in FIG. 19. We assume the user selects Hs_366575 as shown in window 1420 of FIG. 19. At this point the user decides the query is complete, and clicks on the Display button 1450, as shown in FIG. 20. The query results are then displayed in a separate window 1490, as depicted in FIG. 21.

The great power provided by the graphical query and data mining interface in accordance with the first embodiment comes from displaying database information to the user in a way that does not affect the data abstraction provided by the graphical query interface, and from filtering displayed results according to previous user selections. In this manner the user is provided with a graphical indication of the quality of the query as the query is constructed. Thus, if a selection would cause no data to be returned, the user will have a visual indication of this while the query is being built, and can then make appropriate changes to the query to retrieve valid data. In addition, if a query would cause too many records to be returned, the user will generally have a visual indication of this before the query is even executed, thereby allowing the user to modify the query to narrow it down to retrieve a suitable number of records.

The discussion above relating to FIGS. 13-21 describes a first embodiment that filters the data selection according to previous user selections in building the query. A second embodiment is now presented that uses user selections to dynamically change the graphical representation of a database presented to a user. Predefined rules specify relationships in the database, and the selection of a column in the graphical representation results in checking the predefined rules for the selected column. If one or more predefined rules for the selected column exist, the graphical representation may be modified according to the predefined rule(s) for the selected column. In this manner relationships between columns may be used to limit the graphical representation displayed to a user according to selections by the user.

Figure 22:
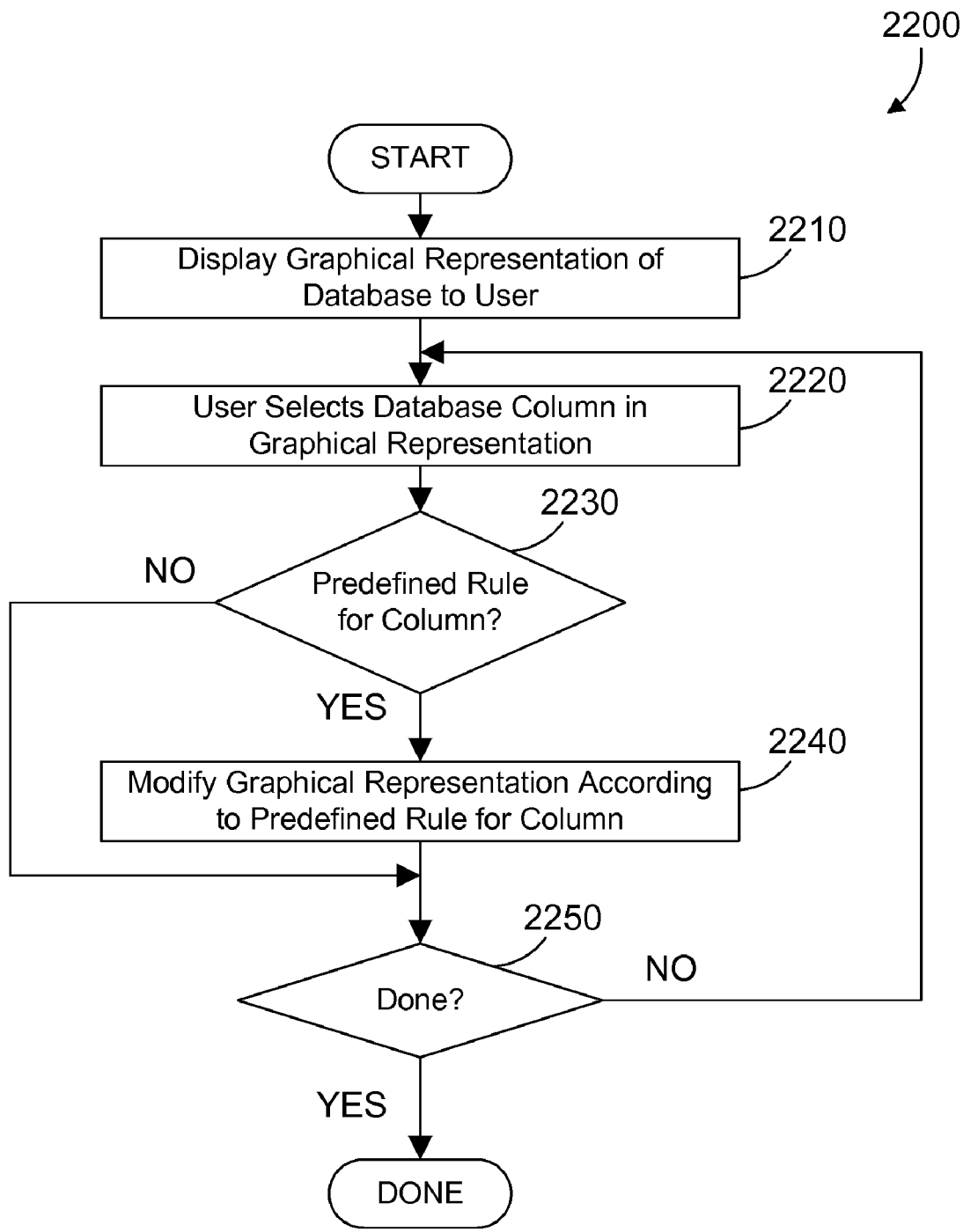
FIG. 22 is a flow diagram of a method executed by the graphical query and data mining interface in accordance with the second embodiment.

Referring now to FIG. 22, a method 2200 in accordance with the second embodiment displays a graphical representation of a database to a user (step 2210). The user then selects a database column in the graphical representation (step 2220). If there is a predefined rule for the column the user selected (step 2230=YES), the graphical representation is modified according to the predefined rule for the column (step 2240). Once the user is done (step 2250=YES), method 2200 is done. If the user is not done (step 2250=NO), method 2200 loops back to step 2220 and continues. If there is no predefined rule for the selected column (step 2230=NO), method 2200 bypasses step 2240.

The most common modification of the graphical representation in step 2240 is the elimination of part of the graphical representation. The predefined rules specify restrictions between columns that restrict the user's choice once a column is selected by eliminating, deleting, hiding, or otherwise making a portion of the graphical representation unavailable to the user for selection. The second embodiment thus allows predefined rules to restrict a user's choices in building a query based on the user's previous selections. Note that the predefined rules relate to relationships between columns. The predefined rules may specify relationships between columns, or relationships between columns based on data values in one or more of the columns.

In the second embodiment, the graphical query and data mining interface 124 shown in FIG. 1 reads the database relationship document 125 to generate the graphical representation of the database (or a portion or the database). The filtered display mechanism 126 is used to display the graphical representation and to modify the graphical representation.

Figure 23:
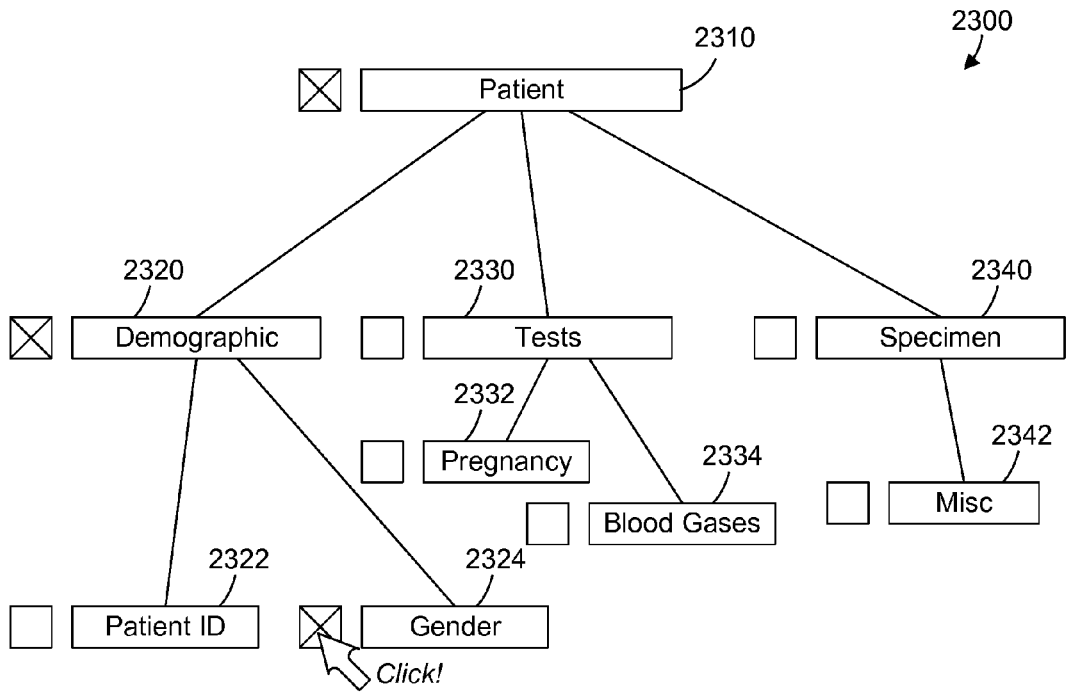
FIG. 23 is a sample graphical representation of columns in a database to illustrate the changing of the graphical representation to reflect previously-selected columns in accordance with the second embodiment.
Figure 24:
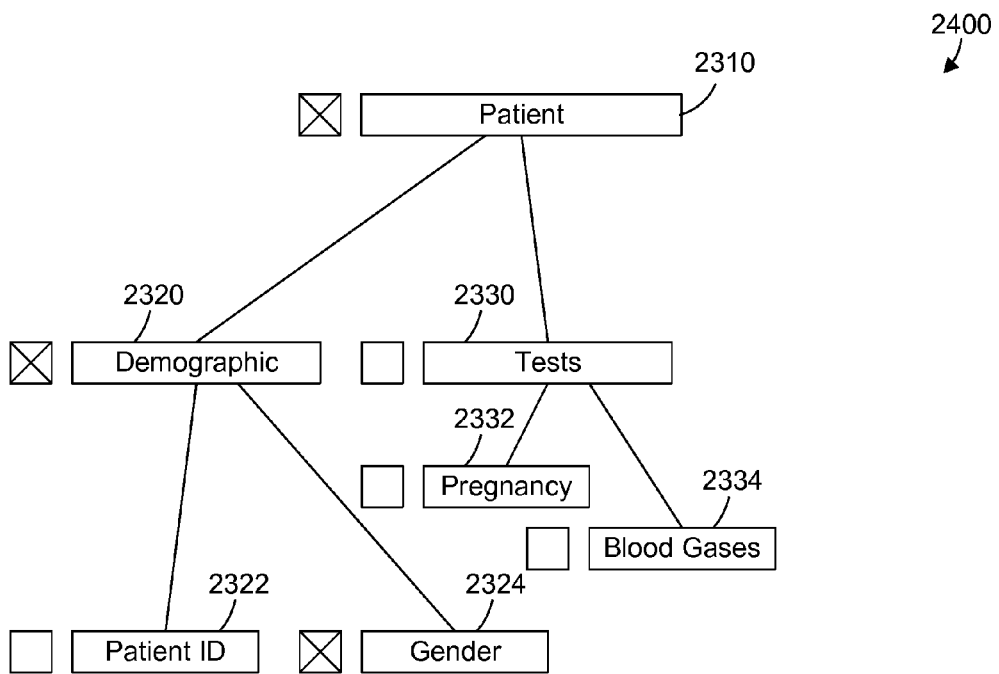
FIG. 24 is the sample graphical representation in FIG. 22 after the Gender item is selected, as shown in FIG. 23, which causes the Specimen item 2340 to be removed from the graphical representation.

One example of possible restrictions between columns is shown by the example illustrated in FIGS. 23 and 24. The graphical representation 2300 shows a database for medical research. Note that only a few columns are shown for the purpose of illustration, realizing that many more columns could exist in the database. We assume the user has clicked to X the box next to the patient node 2310, indicating the patient column in the database has been selected for use in the query. The user has also clicked to X the box next to the Demographic node 2320. We now assume that a predefined rule exists that only allows use of the Specimen column in a query (represented by Specimen node 2340 in the graphical representation) if the patient's gender is not known. In other words, the specimen data may only be accessed if the gender of the patient is anonymous. We assume the user clicks to X the box next to the Gender node 2324, as shown by the Click! in FIG. 23.

Once the user has selected the Gender node 2324 as shown in FIG. 23, the graphical representation of the database may be modified according to the predefined rule for the Gender column, which we assume states that Gender removes Specimen. As a result, the graphical representation 2300 in FIG. 23 is modified to delete the Specimen node 2340, which automatically removes all its subnodes. The modified graphical representation is shown as 2400 in FIG. 24. The example in FIGS. 23 and 24 shows how the selection of one column may preclude selection of a different column that is incompatible with the user's selection according to the predefined rules. Note how this differs from the filtering of actual data in the first embodiment.

The predefined rule "Gender removes Specimen" could also automatically generate a reciprocal rule "Specimen removes Gender". By defining the rule and automatically generating its reciprocal rule, reciprocal restrictions may be easily generated by only specifying one rule. Note, however, that some restrictions may be non-reciprocal, which would require defining each rule, or defining whether a rule has a reciprocal rule or not.

Figure 25:
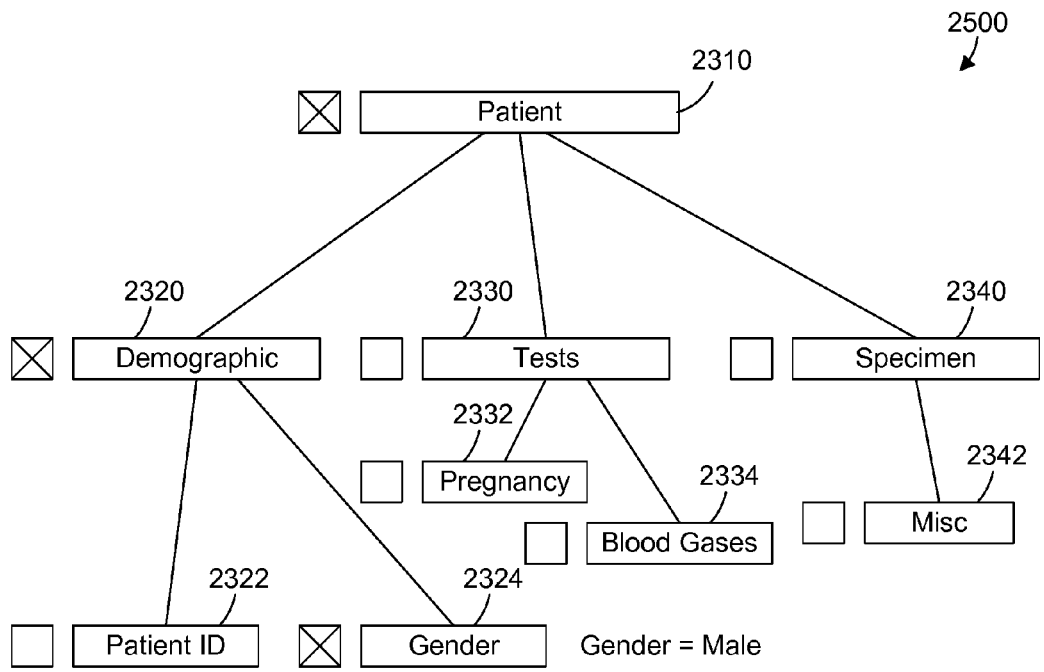
FIG. 25 is a sample graphical representation shown in FIG. 23 with the value Gender=Male specified.
Figure 26:
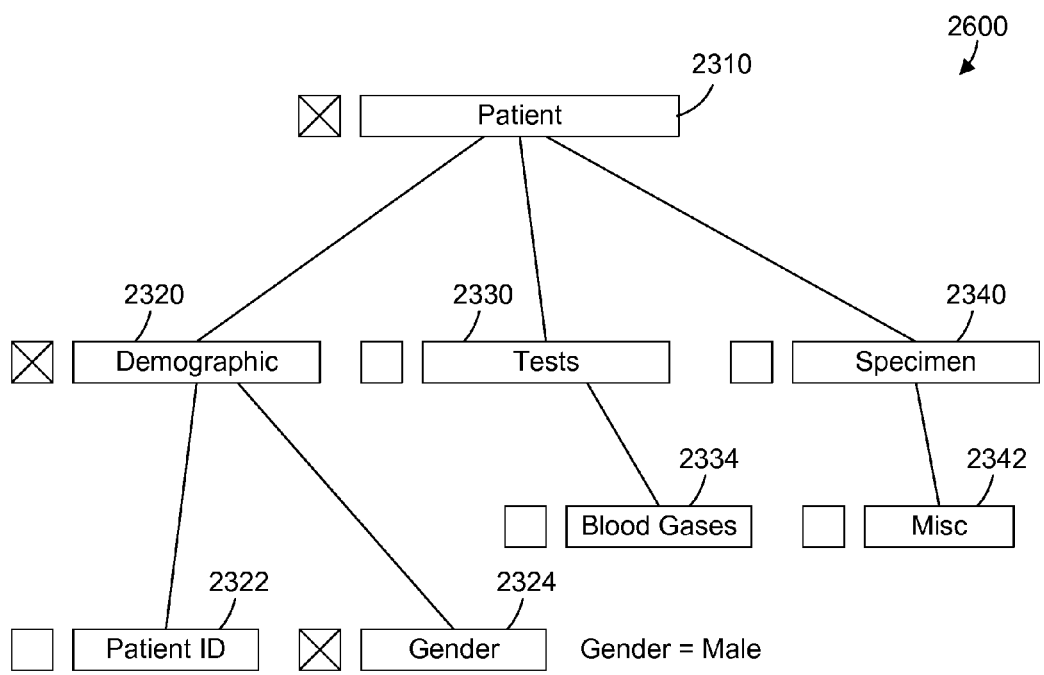
FIG. 26 is the sample graphical representation in FIG. 25 that shows the removal of the Pregnancy item 2332 from the graphical representation due to the selection of Gender=Male in FIG. 25.

The example in FIGS. 25 and 26 illustrates that both columns and data may be used to define a restriction on one or more other columns. Logic tells us that if the gender of a patient is male, that selection of a pregnancy test would be an erroneous query. As shown in the graphical representation 2500 in FIG. 25, we assume the user has clicked to X the box next to the Patient node 2310, has clicked to X the box next to the Demographic node 2320, and has clicked to X the box next to the Gender node 2324. Now we further assume that a specific value of "male" is specified for the Gender column. Once the "Gender=Male" condition on the Gender column is defined in the query, the graphical representation 2500 may be modified to delete the Pregnancy test node 2332, as shown in modified graphical representation 2600 in FIG. 26. By deleting the Pregnancy test node 2332, the user will not be able to select the Pregnancy column in the same predicate as the Gender=Male clause. The predefined rule that makes this possible is that Gender=Male removes Pregnancy from the graphical representation.

Figure 27:
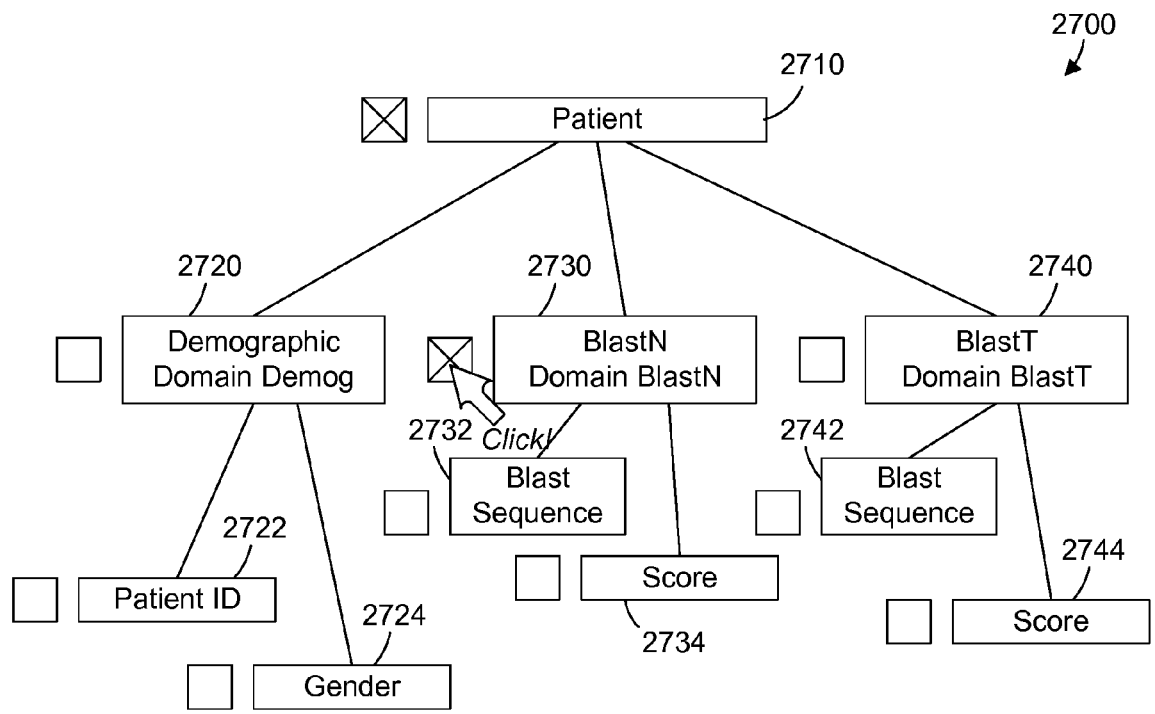
FIG. 27 is another sample graphical representation of columns in a database showing the concept of domains within a database.

The second embodiment also extends to the concept of a "domain" in a database. Referring to FIG. 27, the graphical representation 2700 includes a Patient node 2710 that has three child nodes, Demographic 2720, BlastN 2730, and BlastT 2740. Each of these child nodes define a "domain" within the database, which is used herein to broadly mean any logical grouping of columns in the database. BlastN and BlastT represent different algorithms that may be used to analyze data in the database. Each returns the same information but computed in different ways over different types of data. Each of these types of data can be compared to data within the user organization. However, to string several of the Blast operations together would not make sense because they do not directly relate to each other, which means that their data cannot be relationally joined.

For the purpose of this example, we assume each domain is mutually exclusive of the others. This means that selection of any one of the domains does not allow of a different domain. We assume for the example in FIG. 27 that the user has clicked to X the box next to the Patient node 2710, then clicks to X the box next to the BlastN node 2730. By virtue of selecting the BlastN domain (by the user selecting the BlastN node 2730 in the graphical representation), the predefined rules indicate that selection of Demographic 2720 and BlastT 2740 cannot be performed, so these nodes and their sub-nodes are removed from the graphical representation, resulting in the graphical representation 2800 shown in FIG. 28.

Figure 28:
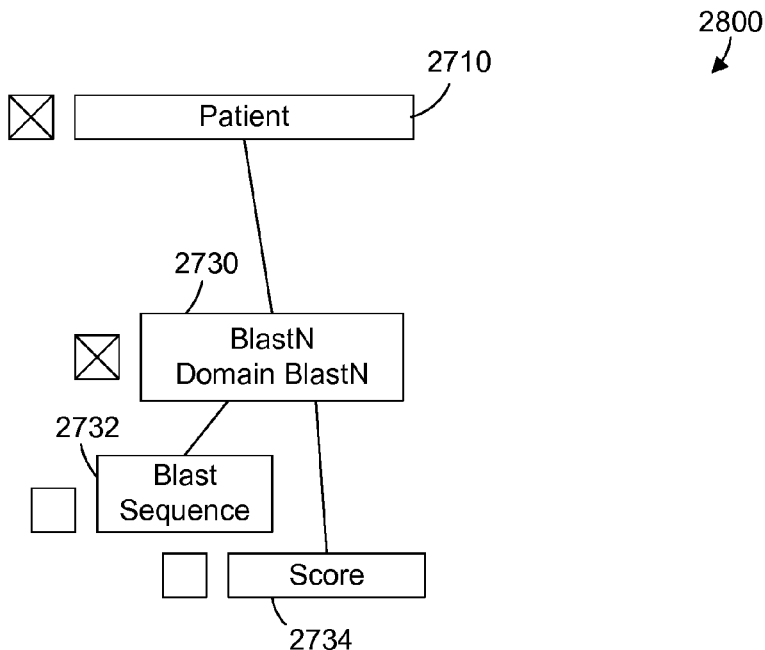
FIG. 28 is the sample graphical representation in FIG. 27 that shows the removal of the domains 2720 and 2740 in FIG. 27 due to the selection of the domain 2730.

While the different domains in FIG. 27 are shown as different sub-trees in the graphical representation, the concept of domains can extend to any suitable method for grouping together columns according to related functionality. In addition, while the selection of the BlastN node 2730 in FIG. 27 serves to eliminate the other, conflicting domains from the graphical representation, as shown in graphical representation 2800 in FIG. 28, a similar function could be performed by the user selecting any column in the BlastN domain. In other words, if the user clicked on the Blast Sequence node 2732 or the Score node 2734, the result would be the same, and the graphical representation would be modified as shown in FIG. 28.

From the discussion of FIGS. 23-28 above, one might assume that the user selection causes the graphical representation to be automatically and immediately modified. Note, however, that the modification could be done at some point later, rather than immediately. For example, there could be a "refresh" button on the graphical representation that would allow the user to select several items before refreshing the display of the graphical representation to make one or more columns unavailable for selection by the user. In addition, there could be a timed refresh that updates the graphical representation each time a specified time period expires, such as ten seconds.

The predefined rules may specify any suitable relationships between columns in the database. One way to specify the predefined rules is to provide an optional additional definition for each column that lists columns that are not allowed in conjunction with column for which the rule is being defined. For the example shown in FIGS. 23 and 24, the following addition to the Gender column (or field) definition would provide the restriction between the Gender column and the Specimen column.

```
<Field name= "Gender">
    <AccessMethod column="DEMOG_GEN" table="DEMOG" />
        <Type dataType="char">
        <value>Male</value>
        <value>Female</value>
        </Type>
        <Remove>
        <Field name="data://Specimen" />
        </Remove>
    </Field>
```

A "reciprocal" keyword could also be added to the restriction definition that would allow automatic generation of the reciprocal restrictions as well.

For the example shown in FIGS. 27 and 28, the following addition to the BlastT column definition would provide the restriction between the BlastT domain and the other domains.
```
<Category name "BlastT" domain="BlastT">
... field information under the category ...
</Category>
...
<DomainInteractions>
<Domain name="BlastT">
<Restrict domain="BlastN">
<Restrict domain="Demog"/>
</Domain>
... more domains listed ...
</DomainInteractions>
```

Note that the preferred embodiments also handles the case where conditions are ORed together. For example, let's assume a user wanted to build the following query:

Select Gender=female and pregnancy test=positive
OR
Gender=male and testosterone test>threshold Once the user inserts the OR operator into the query, the restrictions are logically reset so that, in the above example, the selection of a column in the first clause does not affect the selection of a column in the second clause, because they are logically ORed together.

One skilled in the art will appreciate that many variations are possible within the scope of the present invention. Thus, while the invention has been particularly shown and described with reference to preferred embodiments thereof, it will be understood by those skilled in the art that these and other changes in form and details may be made therein without departing from the spirit and scope of the invention. For example, it is within the scope of the preferred embodiments to actually run a partial query in a background process as the user continues to build the query, and to display a number of rows that the query returns. In this manner the use will have information retrieved from the database regarding the number or rows the query will return in making future selections when continuing the construction of the query. In addition, while the second embodiment is described herein in the context of modifying a graphical representation of a database according to predefined rules, the second embodiment expressly extends to any manner of making one or more columns unavailable for selection by the user, including deleting, hiding, greying out, or otherwise making the columns unavailable for selection by the user.

The invention claimed is:

1. An apparatus comprising:
   at least one processor;
   a memory coupled to the at least one processor;
   a database residing in the memory; and
   a graphical query interface residing in the memory and executed by the at least one processor, the graphical query interface displaying in a first window a graphical representation of a plurality of user-selectable icons, each user-selectable icon corresponding to a column defined in the database, the graphical representation including at least one line connecting the plurality of user-selectable icons to represent at least one relationship between columns in the database represented by two of the plurality of icons connected by a line, and in response to a user selection of an icon in the graphical representation corresponding to a first column in a first step in building a query, the graphical query interface altering the graphical representation to make at least one icon corresponding to at least one different column in the graphical representation unavailable for selection by the user in a subsequent step in building the query according to at least one predefined rule for the first column that specifies at least one restriction between the first column and the at least one different column, the graphical query interface during display of the graphical representation in the first window further displaying in a second window at least one selectable value corresponding to values in the database corresponding to the first column.

2. The apparatus of claim 1 wherein the at least one restriction comprises mutual exclusion for the first column and the at least one different column.

3. The apparatus of claim 1 wherein the graphical representation includes a plurality of domains that each define a logical grouping of columns in the database, wherein the at least one predefined rule includes at least one condition for displaying each of the plurality of domains.

4. The apparatus of claim 1 wherein the graphical query interface alters the graphical representation to make at least one icon in the graphical representation corresponding to at least one column unavailable for selection by the user by performing at least one of the following steps:
   eliminating the at least one icon corresponding to the at least one column from the graphical representation;
   hiding the at least one icon corresponding to the at least one column in the graphical representation from view of the user; and
   greying out the at least one icon corresponding to the at least one column in the graphical representation.

5. The apparatus of claim 1 wherein the at least one restriction specifies a reciprocal keyword that causes the graphical query interface to automatically generate reciprocal restrictions between the first column and the at least one different column.

6. The apparatus of claim 1 wherein the graphical query mechanism resets the at least one restriction to make the at least one different column in the graphical representation available for selection by the user when the user specifies an OR operator when building the query.

7. A computer-readable program product comprising:
   (A) a graphical query interface that displays to a user in a first window a graphical representation of a plurality of user-selectable icons, each user-selectable icon corresponding to a column defined in the database, the graphical representation including at least one line connecting the plurality of user-selectable icons to represent at least one relationship between columns in the database represented by two of the plurality of icons connected by a line, and in response to a user selection of an icon in the graphical representation corresponding to a first column in a first step in building a query, the graphical query interface altering the graphical representation to make at least one icon corresponding to at least one different column in the graphical representation unavailable for selection by the user in a subsequent step in building the query according to at least one predefined rule for the first column that specifies at least one restriction between the first column and the at least one different column, the graphical query interface during display of the graphical representation in the first window further displaying in a second window at least one selectable value corresponding to values in the database corresponding to the first column; and
   (B) recordable media bearing the graphical query interface.

8. The program product of claim 7 wherein the at least one restriction comprises mutual exclusion for the first column and the at least one different column.

9. The program product of claim 7 wherein the graphical representation includes a plurality of domains that each define a logical grouping of columns in the database, wherein the at least one predefined rule includes at least one condition for displaying each of the plurality of domains.

10. The program product of claim 7 wherein the graphical query interface alters the graphical representation to make at least one icon in the graphical representation corresponding to at least one column unavailable for selection by the user by performing at least one of the following steps:
    eliminating the at least one icon corresponding to the at least one column from the graphical representation;
    hiding the at least one icon corresponding to the at least one column in the graphical representation from view of the user; and
    greying out the at least one icon corresponding to the at least one column in the graphical representation.

11. The program product of claim 7 wherein the at least one restriction specifies a reciprocal keyword that causes the graphical query interface to automatically generate reciprocal restrictions between the first column and the at least one different column.

12. The program product of claim 7 wherein the graphical query mechanism resets the at least one restriction to make the at least one different column in the graphical representation available for selection by the user when the user specifies an OR operator when building the query.

13. A computer-implemented method for a user to build a query to a database, the method comprising the steps of:
    displaying to the user in a first window a graphical representation of a plurality of user-selectable icons, each user-selectable icon corresponding to a column defined in the database, the graphical representation including at least one line connecting the plurality of user-selectable icons to represent at least one relationship between columns in the database represented by two of the plurality of icons connected by a line;
    in response to the user selection of an icon in the graphical representation corresponding to a first column in a first step in building the query, altering the graphical representation to make at least one icon corresponding to at least one different column in the graphical representation unavailable for selection by the user in a subsequent step in building the query according to at least one predefined rule for the first column that specifies at least one restriction between the first column and the at least one different column; and
    during display of the graphical representation in the first window, displaying in a second window at least one selectable value corresponding to values in the database corresponding to the first column.

14. The method of claim 13 wherein the at least one restriction comprises mutual exclusion for the first column and the at least one different column.

15. The method of claim 13 wherein the graphical representation includes a plurality of domains that each define a logical grouping of columns in the database, wherein the at least one predefined rule includes at least one condition for displaying each of the plurality of domains.

16. The method of claim 13 wherein the step of altering the graphical representation to make the at least one icon corresponding to at least one column in the graphical representation unavailable for selection by the user comprises at least one of the following steps:
    eliminating the at least one icon corresponding to the at least one different column from the graphical representation;
    hiding the at least one icon corresponding to the at least one different column in the graphical representation from view of the user; and
    greying out the at least one icon corresponding to the at least one different column in the graphical representation.

17. The method of claim 13 wherein the at least one restriction specifies a reciprocal keyword that causes automatic generation of reciprocal restrictions between the first column and the at least one different column.

18. The method of claim 13 further comprising the step of resetting the at least one restriction to make the at least one different column in the graphical representation available for selection by the user when the user specifies an OR operator when building the query.

* * * * *